H. J. GAISMAN.
PHOTOGRAPHIC APPARATUS.
APPLICATION FILED MAY 6, 1913.
1,238,505.
Patented Aug. 28, 1917.
2 SHEETS—SHEET 2.
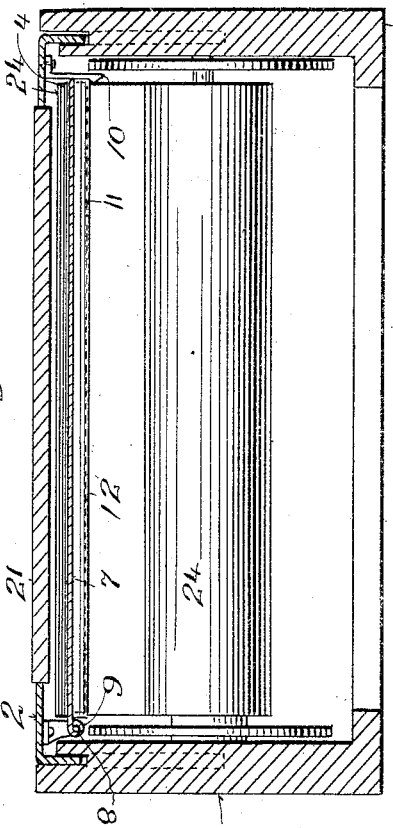
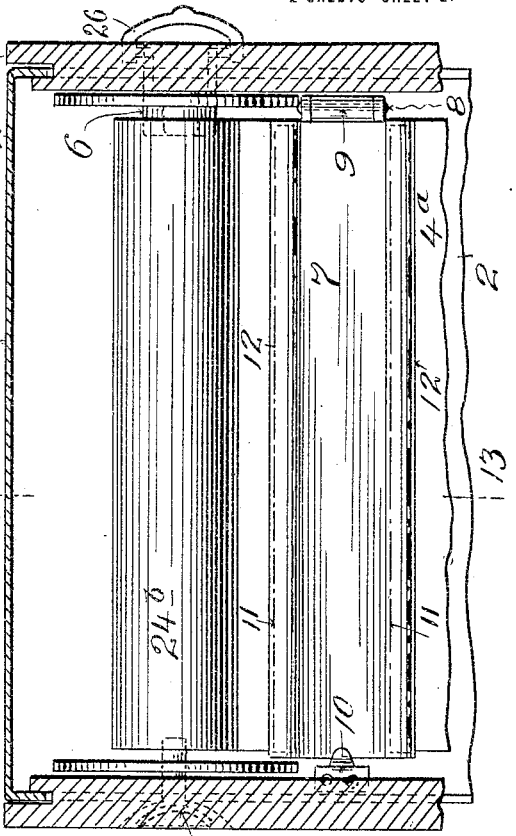
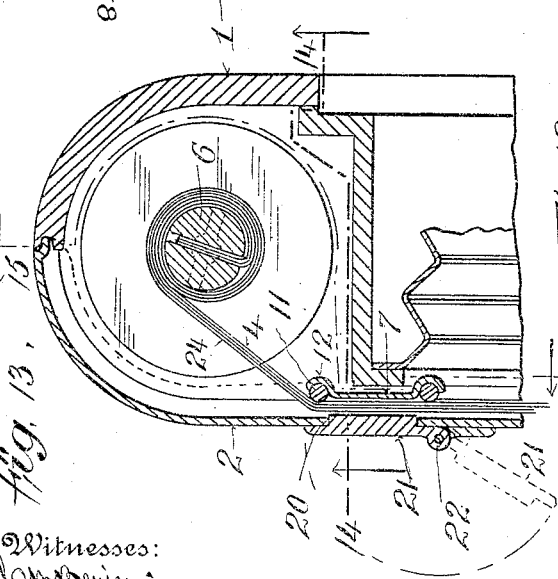
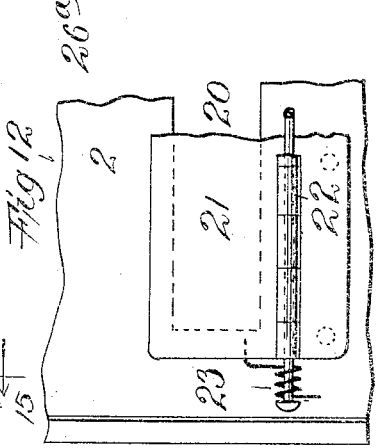
Witnesses:
Inventor
H. J. Gaisman
By his Attorney

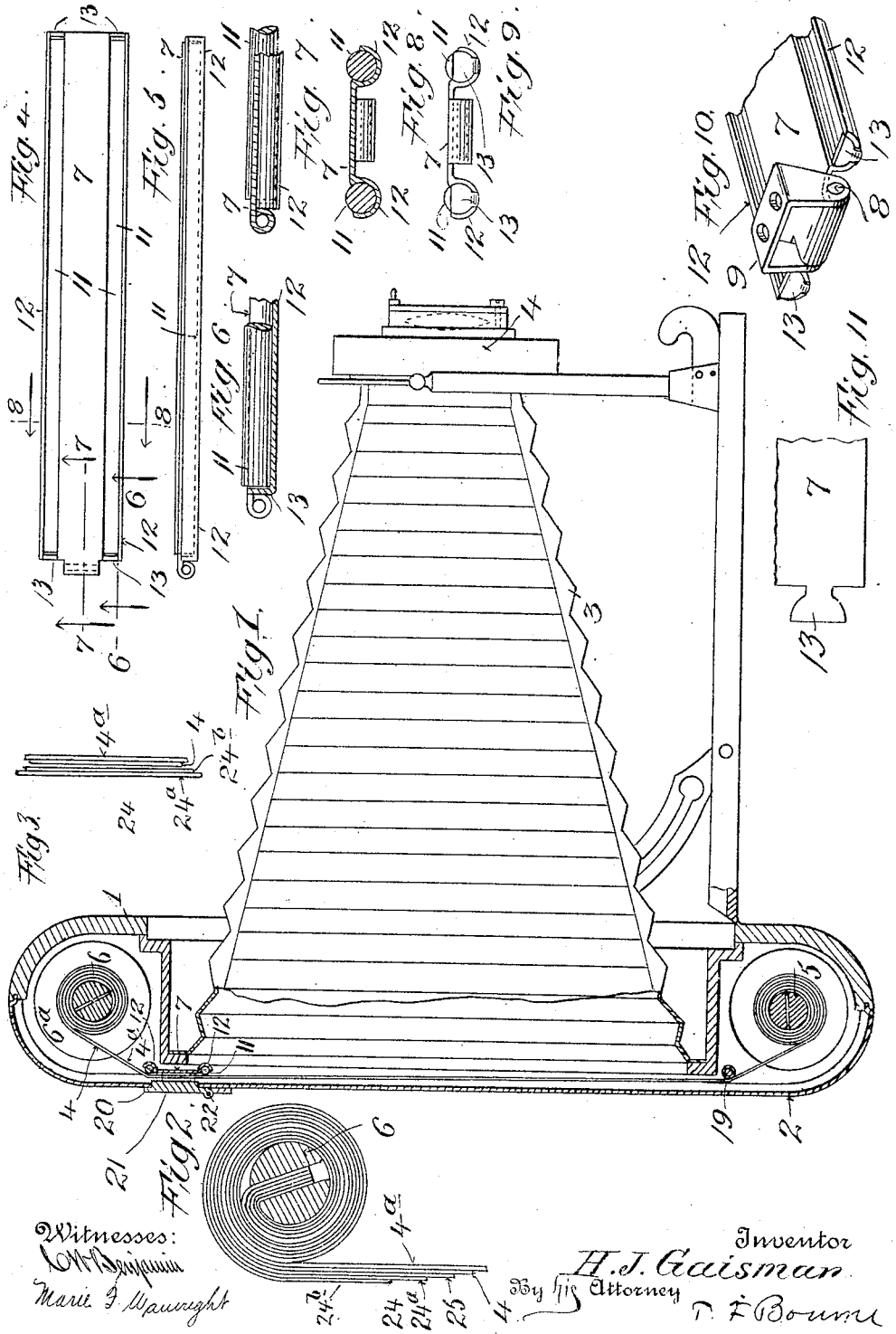

UNITED STATES PATENT OFFICE.

HENRY J. GAISMAN, OF NEW YORK, N. Y., ASSIGNOR TO EASTMAN KODAK COMPANY, OF ROCHESTER, NEW YORK, A CORPORATION OF NEW YORK.

PHOTOGRAPHIC APPARATUS.

1,238,505.

Specification of Letters Patent.

Patented Aug. 28, 1917.

Application filed May 6, 1913. Serial No. 765,787.

*To all whom it may concern:*

Be it known that I, HENRY J. GAISMAN, a citizen of the United States, and resident of New York city, borough of Manhattan, in the county of New York and State of New York, have invented certain new and useful Improvements in Photographic Apparatus, of which the following is a specification.

My invention has for its object to provide improved means enabling desired designations to be photographed upon the sensitized surface of a photographically sensitive element or film, in a simple and effective manner, without permitting light to affect other parts of the film while such designations are being produced thereon, thereby enabling ordinary lens exposure of the film adjacent to such designation thereon and adjacent thereto, either after or before the designation is produced upon the film. By such means I am enabled to so mark the film photographically adjacent to an exposed portion of the film that the designation and accompanying image upon the film may be produced in a picture printed from the negative so produced.

In carrying out my invention I provide a camera having an opening in its wall, such as in its cover, on the outer side of the contained film, with a support located opposite to said opening and on the inner side of the film, against which the film may bear when being written or marked against through said opening, and upon the outer side of the film between the latter and said opening, is located an opaque or substantially opaque film protector or covering having a displaceable surface or being of a character adapted to have a portion thereof displaced, as by writing or marking against the same, said protector preferably lying against the film, and preferably being wound therewith upon its supporting spool or spools, whereby when the film and its protector are in position in the camera, the protector being located outwardly with respect to the film, enables a desired designation to be produced upon the protector, as by writing thereon or against the same through said opening to displace corresponding portions of the protector, whereby the light may affect the sensitive surface of the film through such displaced portions of its protector, without regard to the use of the lens, enabling the film to be exposed through the lens in the ordinary manner. A suitable movable cover or shield is provided to keep said opening closed when not writing upon the protector.

In a preferred embodiment of my invention a plate or support against which the film bears when being written or marked against is carried by said cover, and an opening, through which the film and its protector are to be written against, is provided in said cover, the latter also carrying a cover or shield for said opening.

My invention further comprises novel details of improvement and combinations of parts that will be more fully hereinafter set forth and then pointed out in the claims.

Reference is to be had to the accompanying drawings forming part hereof, wherein, Figure 1 is a partially sectional view of a camera embodying my invention, showing the bellows extended in position for exposure;

Fig. 2 is an enlarged detail view of the film and its protector;

Fig. 3 is a detail sectional view of a modified film protector;

Fig. 4 is a detail face view of the support for the portion of the film to be written against;

Fig. 5 is an edge view thereof;

Figs. 6, 7 and 8 are detail sectional views on the lines 6, 6, 7, 7, 8, 8, respectively in Fig. 4;

Fig. 9 is an end view of Fig. 4;

Fig. 10 is a detail perspective of a portion of the plate or support shown in Fig. 4;

Fig. 11 is a plan of a portion of the blank for forming said plate or support;

Fig. 12 is a partial plan view of the camera cover;

Fig. 13 is an enlarged detail section on the line 13, 13, in Fig. 15;

Fig. 14 is a section on the line 14, 14, in Fig. 13, and

Fig. 15 is a section on the line 15, 15, in Fig. 13.

Similar numerals of reference indicate corresponding parts in the several views.

In the drawings the numeral 1 indicates a camera box or frame having a removable cover or back 2, bellows 3, and lens $a$, all of which may be generally of any suitable construction, the cover being shown flanged to fit in the grooves or recesses in the box or casing and provided with fastening means, as customary. The sensitized element, such as the sensitized film 4, is adapted to be carried on the spools 5, 6 as usual. Within the camera is a plate or support 7, of suitable width and extending transversely across the camera and so located that the film will pass over the same, and so organized as to prevent light striking the sensitive surface of the film in front thereof when exposure is made through the lens. Plate 7 is preferably movably supported within the camera, and for this purpose I have shown said plate pivotally carried upon the cover 2, being shown pivoted at 8 to a bracket 9, attached at one side of the cover, a suitable flexible catch 10 carried by the camera at the opposite end of the support 7 serving to retain the same in operating position beneath or opposed to the film. To prevent injury to the film or its sensitized surface and to prevent and reduce friction on the film as it is moved through the camera, I have shown support 7 provided with rollers 11 extending along the longitudinal edges of said support, and projecting slightly above the plane of the latter. For this purpose I have shown the metal of plate 7 made in a grooved form at 12, the ends of the metal being bent up at 13, Fig. 10, retaining the rollers in position. The spools 5, 6, may be supported upon the camera frame in any well known manner, as upon supporting devices 26, 26ª.

The camera is shown provided with an opening 20 in one of its walls, as in its cover 2, opposed to the plate or support 7 on the outer side of the film, and at one side of the line of exposure to the lens, through which opening access may be had to write or mark against the film at the portion that is over or in front of the plate or support 7. At 21 is a closure for opening 20, shown in the form of a cover or plate hinged upon cover 2 at 22, said hinge being shown provided with a spring 23, normally tending to keep cover 21 closed over opening 20 to exclude light. By preference, cover 21 is formed with an internal projecting portion to fit within opening 20 as shown in Fig. 13 to aid in excluding light from opening 20.

In order to permit designations, such as names, initials, dates, etc., to be photographed upon the sensitized surface of the film without injury to the sensitized surface of the film and without regard to the use of the lens, I provide the film with an opaque protector or protecting covering 24 that overlies the film on the side next adjacent to the cover 2. Said protector is of such a nature as to permit it or a portion of it or its surface to be displaced when written or marked upon or against. Said covering may comprise as its components translucid paper and an opaque or substantially opaque displaceable material thereon, such as a coating comprising carbon or other suitable analogous material, which, when written upon or against, will be displaced where the pencil, stylus or the like engages or acts upon the same, enabling the light to strike through such displaced portions of the protecting covering to affect the sensitive surface of the film opposed thereto. As indicated in Fig. 2, illustrating an enlarged view of spool 6 carrying the film and its protecting covering, the sensitive surface 4ª of the film is to be opposed to plate or support 7 and the lens, and the protecting covering 24, has a displaceable surface of the character described, indicated at 24ª upon a translucid sheet or strip 24ᵇ, and between the film and said displaceable surface is shown a piece or layer of translucid material, such as paper 25, said parts 24ª, 24ᵇ being as in the nature of any ordinary opaque carbon transfer paper. The translucid paper or analogous shield or strip 25 prevents the displaceable material or carbon from contact with the surface of the film when they are wound together, or to cover the carbon when being handled, although the cover or shield 25 may be dispensed with, and the coating 24ª may be outward, as in Fig. 3.

In accordance with my invention the film having the protecting covering of the character described may be mounted in the camera and connected with the winding up spool 6, in the manner stated, and the winding up handle 26 of the camera may be connected with said spool in the usual manner, the cover 21 being normally closed. When it is desired to produce a designation upon the film, the cover 21 is swung back exposing, through opening 20 of cover 2, the protecting covering 24 and the designation is written or marked upon the latter, the plate or support 7 sustaining the film opposite such writing. As the writing or marking is thus produced upon or against the protecting covering 24, material thereon is displaced by such writing or marking which permits the light to strike therethrough and affect the sensitive surface of the film in front of the writing or marking, so that when the film is developed and printed the resulting picture will bear such designation. The cover 21 is then preferably closed. The film may then be exposed through the lens in the usual manner, and wound upon the spool 6 as customary, or the film may be exposed through the lens before the designation is produced thereon, in the manner stated. It will also be understood that either before or after the film has been exposed to the lens the film and opening 20 may be moved relatively one to another to permit writing or marking upon the film upon the part thereof carrying or to carry the image, photographed or to be photographed on the film, so that the designation will appear on the film in with such image.

The plate or support 7 serves to prevent the light, entering the camera through the lens, from unduly affecting the surface of the film opposed to said plate, whereby a dark mortise having light or white lines constituting the designation will result in the picture or print produced from the developed film or negative, and said plate also prevents the light, when striking through the designation written or marked upon the protecting covering 24 from entering the camera to affect the main portion of the film exposed to the lens. By means of my improvements, I am enabled in a simple and expeditious manner, by means of the protecting covering 24 of the film and the opening 20 opposed thereto, to produce desired designations upon the film at any time before or after exposing the same through the lens, whereby each or any picture taken may be marked in a desired manner, such as with the name of the object, the date, the name of the party taking the picture, and the like.

Without attempting to define the action of the stylus in rendering the carbon paper translucent by writing against it, it is clear that the carbon coating is locally displaced either by pressing the particles aside or bodily removing them as by a scraping action or forming them into a thinner translucent film and it is immaterial upon what theory the result is accomplished so long as sufficient light is permitted to pass to affect the film.

In my application for Letters Patent for improvements in photography, filed April 14, 1913, Serial No. 760,877, I have set forth a sensitized element or film provided with a protecting covering having a displaceable surface or being of a displaceable nature, and the same is adapted for use in conjunction with my present improvements. Therefore, I do not in this application separately claim the film provided with such a protecting covering, and it will be understood that any of the forms of film and its protecting covering set forth in my said application may be used in the camera described herein. While I have set forth a simple and efficient form of camera adapted to carry my present invention into use, it will be understood that the same is not limited to details of construction and arrangements of parts set forth, as the same may be varied, within the scope of the appended claims, without departing from the spirit of the invention.

I have referred to the film protecting covering as being "opaque," or having an opaque coating thereon, and it will be understood that by "opaque" I mean a material adapted to prevent the actinic rays of light from affecting the sensitized surface of the film, whether the covering be absolutely impervious to light or of the well-known ruby or other color, which, while not absolutely opaque, yet itself permits only such portion of the light to reach the film as would not photographically affect its sensitized surface.

My invention is useful in connection with other forms of holders for photographically sensitized material, as well as cameras and contemplates the improvement of other photographic apparatus for the application of designating marks on the sensitized material according to my disclosure herein.

Having now described my invention what I claim is:—

1. The combination of a camera having an opening in one wall and a support opposed to said opening, the sensitized element in the camera being adapted to pass between said opening and support, and a light protecting covering for said element between the latter and said opening of such a nature as to permit a localized displacement of its light obstructing substance while over said element.

2. The combination of a camera having an opening in one wall and a support opposed to said opening, the sensitized element in the camera being adapted to pass between said opening and support, and a covering for said element between the latter and said opening, said cover having a displaceable light obstructing surface adapted to permit markings to be made thereon through said opening while opposed to said film.

3. The combination of a camera having an opening in one wall, and a support opposed to said opening, the sensitized film in the camera being provided with a protecting covering having an opaque displaceable portion, and means for supporting said film and protecting covering to move together between said support and said opening.

4. The combination of a camera having an opening in one wall, and a support opposed to said opening, the sensitized film in the camera being provided with a protecting covering having an opaque displaceable portion, means for supporting said film and protecting covering to move together between said support and said opening, and a cover movable over said opening.

5. The combination of a camera having an opening in one wall, and a support opposed to said opening, the sensitized film in the camera being adapted to pass between said opening and support, and a flexible covering for said film between the latter and said opening, said covering having a displaceable portion and adapted to permit marking thereagainst through said opening while opposed to said film, and rollers on opposite sides of said support to keep the film out of contact with the latter when moving across the same.

6. The combination of a camera having an opening in one wall, and a support opposed to said opening, the sensitized film in the camera being adapted to pass between said opening and support, and a covering for said film between the latter and said opening, said covering having a displaceable light obstructing portion and adapted to permit marking thereagainst through said opening while opposed to said film, said support being pivotally carried adjacent to one edge of the film, and means to retain said support in position across the inner face of said film opposite said opening.

7. The combination of a camera having an opening in one wall, and a support opposed to said opening, the sensitized film in the camera being adapted to pass between the latter and said opening, and a flexible covering for said film between the latter and said opening, said covering having a displaceable light obstructing portion adapted to permit marking thereagainst and through said opening while opposed to said film, said support having rollers carried thereby along its opposite longitudinal edges.

8. The combination of a camera having an opening in one wall, and a support opposed to said opening, the sensitized film in the camera being adapted to pass between said opening and support, and a flexible covering for said film between the latter and said opening, said covering having a displaceable light obstructing portion and adapted to permit marking thereagainst through said opening while opposed to said film, said support having recesses along its opposite longitudinal edges, rollers fitted in said recesses, and means to retain said support in position opposed to said film.

9. The combination of a camera having a movable cover opposed to one side of a contained film, said cover having an opening through which the film is accessible, of a support carried by said cover on the opposite side of the film from the opening.

10. The combination of a camera having a movable cover opposed to a contained film, said cover having an opening opposed to said film, a support carried by said cover on the opposite side of the film from the opening, and a cover for said opening carried by the first named cover.

11. The combination of a camera having a movable cover opposed to a contained film, said cover having an opening opposed to said film, a support pivotally carried by said cover and spaced therefrom for the passage of the film therebetween, and means for movably retaining said support in operative position.

12. The combination of a camera having a movable cover provided with an opening opposed to a contained film, with a support carried by said cover and spaced therefrom to permit the passage of the film therebetween.

13. The combination of a camera having a movable cover provided with an opening opposed to a contained film, with a support carried by said cover and spaced therefrom to permit the passage of the film therebetween, the surface of said support opposed to the film lying in a plane substantially parallel to the cover.

14. The combination of a camera, means to support a sensitized element therein, the camera having a lens opposed to one side of the element, a support opposed to said side of the element, a cover provided with an opening opposed to said support and located on the side of the element opposite to said lens, and means between the element and opening to protect the element from light and adapted to permit designations to be produced thereon to enable light to strike through said designations to the element as the marking progresses to cause such designations to be light printed on the sensitized element.

15. A camera having means to support a sensitized element, a light obstructing covering at the back of said element, portions of which covering are locally displaceable in arbitrary characters to enable said element to be photographically marked by exposure to light from the rear, independently of the exposure of the front side of the element.

16. A camera having means to support a sensitized element therein, a lens opposed to one side of said element, a protecting covering having an opaque displaceable material opposed to the opposite side of said element, a translucid strip between said element and said covering and opposed to the displaceable material upon the latter, and said covering being accessible to permit marking against it to cause displacement of a portion of its displaceable material and the transfer of a portion of said material to said translucid sheet, whereby light may pass through said marked portion of the covering to cause photographing of such marked portion on said element.

17. The combination with a photographic holder having a lens opening at the front and another opening adapted to admit actinic light at the back of the sensitive body contained in the holder, of means arranged in rear of said body for receiving a designating mark to be light printed upon the contained sensitive body by the action of light admitted through the last mentioned opening.

18. The combination with a photographic holder having a lens opening at the front and another opening at the back of the sensitive body contained within the holder, and a piece of carbon paper interposed between the sensitive body and the opening.

19. The combination with a holder for photographic sensitive material, of a light obstructing covering for the sensitive element contained in the holder, said covering being adapted to yield light permeable marks through the application of localized pressure thereon, said covering being exposed to the application of such pressure from an exterior marking implement.

20. The combination with a holder for sensitized material, of a light obstructing covering for the sensitized element contained in the holder, said covering being exposed exteriorly of the holder and adapted to be rendered locally light permeable.

21. The combination with a holder for sensitized material, having an opening therein adapted to admit a marking implement, of a light obstructing covering interposed between the sensitive element in the holder and the opening, adapted to be rendered locally light permeable by said implement.

22. The combination with a camera body having an opening in the back thereof adapted to admit a marking implement, of a light obstructing covering interposed between the element contained in the holder and the opening, adapted to be rendered locally light permeable through the application of localized pressure thereon by said implement.

23. The combination with a camera body having an opening in the back thereof adapted to admit a marking implement, of a light obstructing covering interposed between the sensitized element contained in the body and the opening, the said covering consisting of a carbon coated sheet adapted to be rendered locally light permeable through the application of localized pressure thereon by said implement.

24. The combination with a camera body having an opening in the back thereof adapted to admit a marking implement, of a light obstructing covering interposed between a sensitized element and the opening, the said covering consisting of a carbon coated continuous web movable across the opening and adapted to be rendered locally light permeable through the application of localized pressure thereon by said implement.

25. The combination with a roll holding camera body having film chambers and an opening located in the back of the body between the chambers and adapted to admit a marking implement, of a carbon coated continuous web superposed in intimate relationship with a continuous strip of sensitized material beneath the opening, the said web being outermost and adapted to yield light permeable marks through the application of localized pressure thereon by said implement, and means for moving the web and strip together across the opening from one of said film chambers to the other.

26. The combination with a holder for a photographically sensitive element having an aperture for the admission of actinic light against the rear face of the element, of an opaque covering between the element and the aperture, said covering having translucent designating characters thereon through which light is transmitted to photographically record the same on the sensitive element.

27. The combination with a holder having an opening therein, and adapted to contain a photographically sensitive strip, of a normally light excluding covering for the strip, the strip and covering being wound together in a roll within the holder and adapted to be unwound together past the opening, said covering being adapted to be rendered locally light permeable by means of an implement applied through the opening.

28. The combination with a camera body having film chambers, an intermediate exposure chamber and an opening in the back thereof located between the exposure chamber and one of the film chambers and adapted to admit a marking implement, of means for moving a sensitized element from one film chamber to the other beneath the opening and a light obstructing covering interposed between said element and the opening, adapted to yield light permeable marks through the application of localized pressure thereon by said implement.

29. The combination with a camera body having film chambers, an intermediate exposure chamber and partition members separating the film and exposure chambers, said body being provided with an opening in the back thereof opposite one of said partitions which is adapted to serve as a writing support, of means for moving a sensitized element from one film chamber to the other beneath the opening and over said partition, and a light obstructing covering interposed between said element and the opening, adapted to be rendered locally light permeable through the application of localized pressure thereon by a marking implement inserted through the opening.

30. The combination with a holder for photographic sensitive material, of means whereon a mark may be created on the side of the sensitive material contained in the holder opposite that upon which the usual exposure is to be made, the holder being adapted to admit light to print the mark on the sensitive material.

31. The combination with a holder for photographic sensitive material having an opening in the front through which an exposure may be made and an opening in the back thereof, of means whereon a mark may be created in rear of the sensitive material contained in the holder, which mark may be light printed on the material through said last mentioned opening.

Signed at New York city, in the county of New York, and State of New York, this 5th day of May, A. D. 1913.

HENRY J. GAISMAN.

Witnesses:
T. F. BOURNE,
MARIE F. WAINRIGHT.